United States Patent
Aksu et al.

(10) Patent No.: US 9,185,597 B2
(45) Date of Patent: Nov. 10, 2015

(54) OPTIMIZING CAPACITY DURING NETWORK CONGESTION

(75) Inventors: Arda Aksu, Martinez, CA (US); Yee Sin Chan, San Jose, CA (US); Iftekhar Rahman, Billerica, MA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 607 days.

(21) Appl. No.: 13/354,961

(22) Filed: Jan. 20, 2012

(65) Prior Publication Data

US 2013/0188484 A1 Jul. 25, 2013

(51) Int. Cl.
*H04W 28/02* (2009.01)
*H04L 12/823* (2013.01)
*H04W 72/14* (2009.01)

(52) U.S. Cl.
CPC .......... *H04W 28/0289* (2013.01); *H04L 47/32* (2013.01); *H04W 72/14* (2013.01)

(58) Field of Classification Search
None
See application file for complete search history.

(56) References Cited

U.S. PATENT DOCUMENTS

| | | | | |
|---|---|---|---|---|
| 7,346,679 | B2 * | 3/2008 | Padmanabhan et al. | 709/224 |
| 2006/0072628 | A1 * | 4/2006 | Liu et al. | 370/516 |
| 2006/0092837 | A1 * | 5/2006 | Kwan et al. | 370/229 |
| 2008/0186846 | A1 * | 8/2008 | Stephenson et al. | 370/230 |
| 2009/0067328 | A1 * | 3/2009 | Morris et al. | 370/230.1 |
| 2009/0213769 | A1 * | 8/2009 | Shen et al. | 370/280 |
| 2009/0232062 | A1 * | 9/2009 | Higuchi et al. | 370/329 |
| 2010/0165920 | A1 * | 7/2010 | Chen | 370/328 |
| 2011/0058475 | A1 * | 3/2011 | Nilsson et al. | 370/235 |
| 2011/0222428 | A1 * | 9/2011 | Charbit et al. | 370/252 |
| 2012/0063300 | A1 * | 3/2012 | Sahin et al. | 370/225 |
| 2012/0076028 | A1 * | 3/2012 | Ko et al. | 370/252 |
| 2012/0100864 | A1 * | 4/2012 | Susitaival et al. | 455/450 |
| 2012/0163204 | A1 * | 6/2012 | Oprescu-Surcobe et al. | 370/252 |
| 2012/0263036 | A1 * | 10/2012 | Barclay et al. | 370/230 |
| 2012/0314671 | A1 * | 12/2012 | Noh et al. | 370/329 |
| 2013/0039292 | A1 * | 2/2013 | Liu et al. | 370/329 |
| 2013/0072167 | A1 * | 3/2013 | Aguirre et al. | 455/414.1 |
| 2013/0163424 | A1 * | 6/2013 | Goerke et al. | 370/235 |
| 2014/0003242 | A1 * | 1/2014 | Nadas et al. | 370/235 |

* cited by examiner

*Primary Examiner* — Hassan Phillips
*Assistant Examiner* — Omeed D Rahgozar

(57) ABSTRACT

A device receives, from mobile devices, scheduling requests for voice packets, and assigns grants to the scheduling requests. The device further determines whether there is network congestion in a network associated with the device. The device also selects a grant, from the grants, when there is network congestion, and drops a voice packets associated with the selected grant. The device assigns physical resource blocks (PRBs) to one or more of the grants that are associated with one or more of the voice packets that are not dropped.

20 Claims, 6 Drawing Sheets

OPTIMIZING CAPACITY DURING NETWORK CONGESTION

BACKGROUND

Wireless communication services, such as voice over Internet Protocol (VoIP) and voice over long term evolution (VoLTE), continue to increase in popularity, leading to increasing numbers of users requesting these services. Mobile communication devices access these services via a long term evolution (LTE) network. A mobile communication device connects to the LTE network via a particular base station, such as an evolved Node B (eNB), when the mobile communication device is within a geographic area associated with the particular base station. Currently, a LTE network prioritizes voice traffic over all other types of traffic in order to provide an almost lossless service quality for the voice traffic. During network congestion, an increasing number of data packets, associated with data services (e.g., web applications), are dropped because the LTE network is trying to guarantee that no voice packets are dropped for voice traffic. As a result, transmission of data traffic and a user's data services experience can suffer considerably.

DETAILED DESCRIPTION OF PREFERRED EMBODIMENTS

The following detailed description refers to the accompanying drawings. The same reference numbers in different drawings may identify the same or similar elements.

Systems and/or methods described herein may drop voice packets when there is network congestion. For example, an evolved Node B (eNB) may receive, from one or more user devices, scheduling requests to transmit packets, such as voice packets and data packets, over a network. If the eNB determines that there is network congestion, the eNB may randomly select and remove a particular quantity of the received scheduling requests. The particular quantity may be less than a predetermined quantity of voice packets that may be dropped without a perceptual degradation of voice quality. Accordingly, the eNB may drop voice packets that are associated with the removed scheduling requests. As a result, the eNB may reduce the network congestion and increase the capacity of the network to handle other types of packets, such as data packets, without significantly decreasing the voice quality experienced by users of the user devices.

Figure 1:
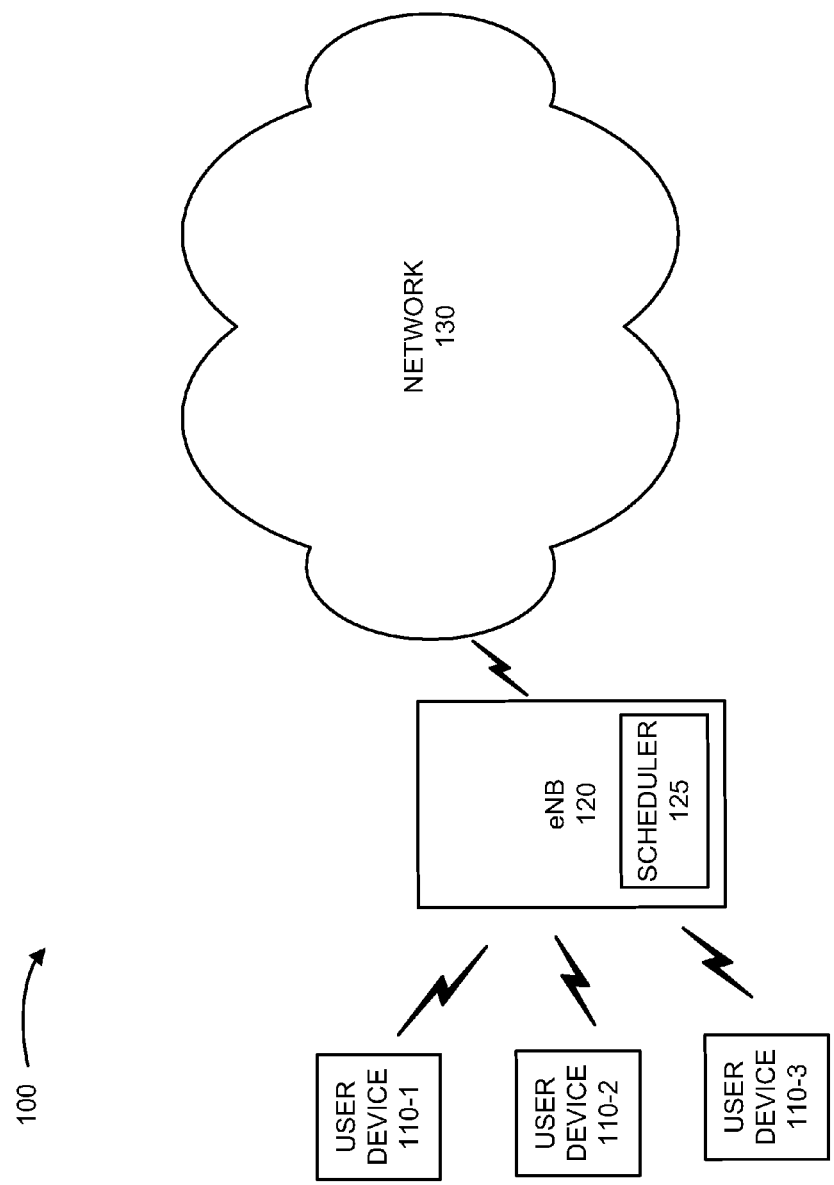
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include user devices 110-1, 110-2, and 110-3 (hereinafter referred to collectively as "user devices 110" and individually as "user device 110"); an eNB 120, which includes a scheduler 125; and a network 130. Devices and/or networks of environment 100 may interconnect via wired and/or wireless connections. Three user devices 110, one eNB 120, one scheduler 125, and one network 130 have been illustrated in FIG. 1 for simplicity. In practice, there may be more user devices 110, eNBs 120, schedulers 125, and/or networks 130.

In one implementation, environment 100 may include an evolved packet system (EPS) that includes a long term evolution (LTE) network and/or an evolved packet core (EPC) network that operate based on the third generation partnership project (3GPP) wireless communication standard. The LTE network may be a radio access network (RAN) that includes one or more eNBs 120 via which user device 110 communicates with the EPC network. The EPC network may include mobility management entities (MMEs), serving gateways (SGWs), packet data network (PDN) gateways (PGWs), and/or one or more other types of network devices that enable user device 110 to communicate with other user devices 110 and/or servers via network 130.

User device 110 may include any device that is capable of communicating with eNB 120. For example, user device 110 may include a mobile communication device, such as a radiotelephone; a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a laptop computer with a wireless air card; a global positioning system (GPS) device; a content recording device (e.g., a camera, a video camera, etc.); a voice over Internet protocol (VoIP) device; an analog terminal adaptor (ATA); etc. Alternatively, or additionally, user device 110 may include a fixed (e.g., provided in a particular location, such as within a user's home) communication device, such as a laptop computer, a personal computer, a tablet computer, a set-top box (STB), a television, a gaming system, etc. In one example implementation, user device 110 may transmit, to eNB 120, scheduling requests that request resources, of eNB 120, that are required to transmit packets (e.g., voice packets, data packets, etc.) via network 130.

eNB 120 may include one or more devices that receive traffic being transported via environment 100, such as voice, video, text, and/or other data, to user device 110 via an air interface. eNB 120 may also include one or more devices that receive traffic, from user device 110, via the air interface and/or that transmit the traffic to devices within environment 100. eNB 120 may perform data processing to manage utilization of radio network services. In one example, eNB 120 may act as a controlling radio network controller (CRNC), a drift radio network controller (DRNC), and/or a serving radio network controller (SRNC). eNB 120 may serve particular user devices 110, and/or may manage connections with user devices 110.

In one implementation, eNB 120 may include scheduler 125. As described further below with reference to FIG. 4, scheduler 125 may receive scheduling requests from user devices 110, and may assign physical resource blocks (PRBs) to transmit packets, associated with the scheduling requests, via network 130.

Network 130 may include one or more wired and/or wireless networks. For example, network 130 may include a cellular network, a public land mobile network (PLMN), a second generation (2G) network, a third generation (3G) network, a fourth generation (4G) network, a fifth generation (5G) network, and/or another network. Additionally, or alternatively, network 130 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

Although FIG. 1 shows example devices/networks of environment 100, in other implementations, environment 100 may include fewer devices/networks, different devices/networks, differently arranged devices/networks, and/or additional devices/networks than those depicted in FIG. 1. Alternatively, or additionally, one or more devices/networks of environment 100 may perform one or more tasks described as being performed by one or more other devices/networks of environment 100.

Figure 2:
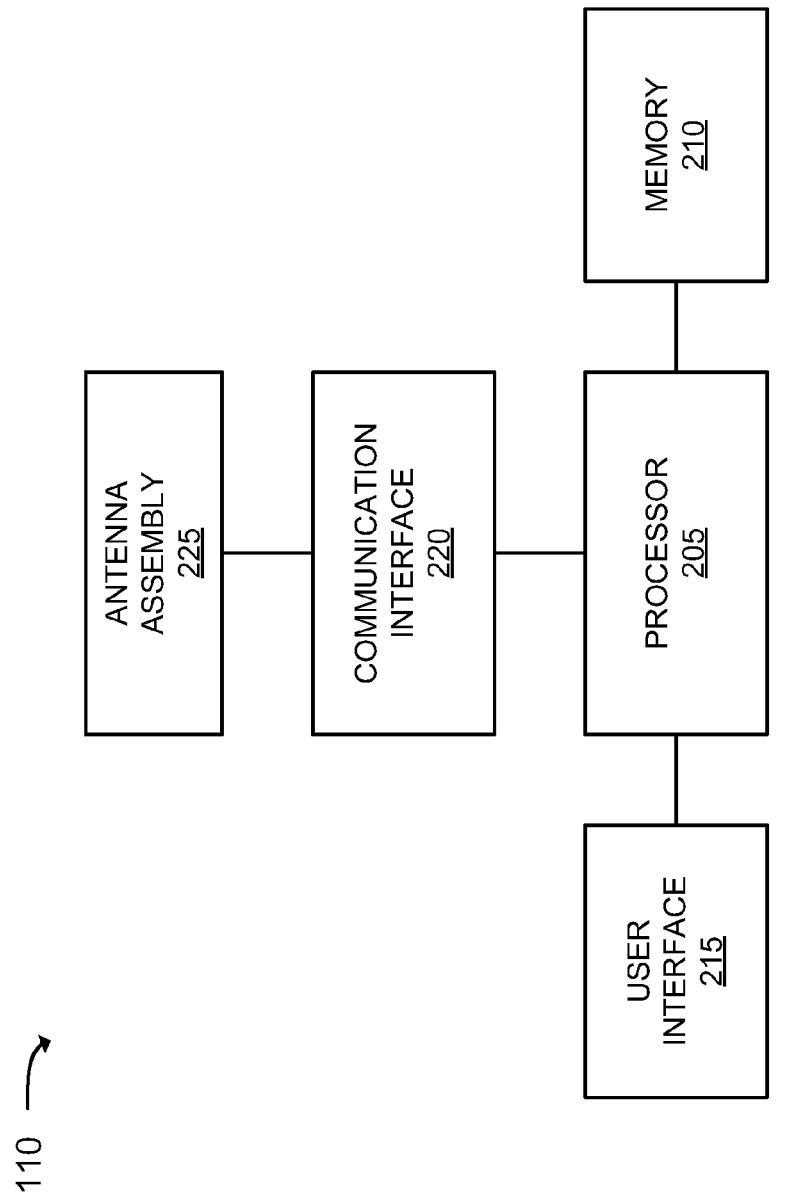
FIG. 2 is a diagram of example components of a user device depicted in FIG. 1.

FIG. 2 is a diagram of example components of user device 110. As shown in FIG. 2, user device 110 may include a processor 205, a memory 210, a user interface 215, a communication interface 220, and/or an antenna assembly 225. Processor 205 may include one or more processors, microprocessors, application specific integrated circuits (ASICs), field programmable gate arrays (FPGAs), etc. Processor 205 may control operation of user device 110 and its components. Memory 210 may include a random access memory (RAM), a read-only memory (ROM), and/or another type of memory to store data and instructions that may be used by processor 205.

User interface 215 may include mechanisms for inputting information to user device 110 and/or for outputting information from user device 110. Examples of input and output mechanisms might include buttons (e.g., control buttons, keys of a keypad, a joystick, etc.) to permit data and control commands to be input into user device 110; a speaker to receive electrical signals and output audio signals; a microphone to receive audio signals and output electrical signals; a display to receive input (e.g., when the display is implemented as a touch screen) and/or output visual information (e.g., text input into user device 110); and/or a vibrator to cause user device 110 to vibrate.

Communication interface 220 may include, for example, a transmitter that may convert baseband signals from processor 205 to radio frequency (RF) signals and/or a receiver that may convert RF signals to baseband signals. Alternatively, communication interface 220 may include a transceiver to perform functions of both a transmitter and a receiver. Communication interface 220 may connect to antenna assembly 225 for transmission and/or reception of the RF signals. Antenna assembly 225 may include one or more antennas to transmit and/or receive RF signals over the air. Antenna assembly 225 may, for example, receive RF signals from communication interface 220 and transmit the RF signals over the air, and receive RF signals over the air and provide them to communication interface 220. In one implementation, for example, communication interface 220 may communicate with a network, such as network 100.

As will be described in detail below, user device 110 may perform certain operations. User device 110 may perform these operations in response to processor 205 executing software instructions (e.g., computer program(s)) contained in a computer-readable medium, such as memory 210, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 210 from another computer-readable medium or from another device.

The software instructions contained in memory 210 may cause processor 205 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may include fewer components, different components, differently arranged components, and/or additional components than those depicted in FIG. 2. Additionally, or alternatively, one or more components of user device 110 may perform one or more of the tasks described as being performed by one or more other components of user device 110.

Figure 3:
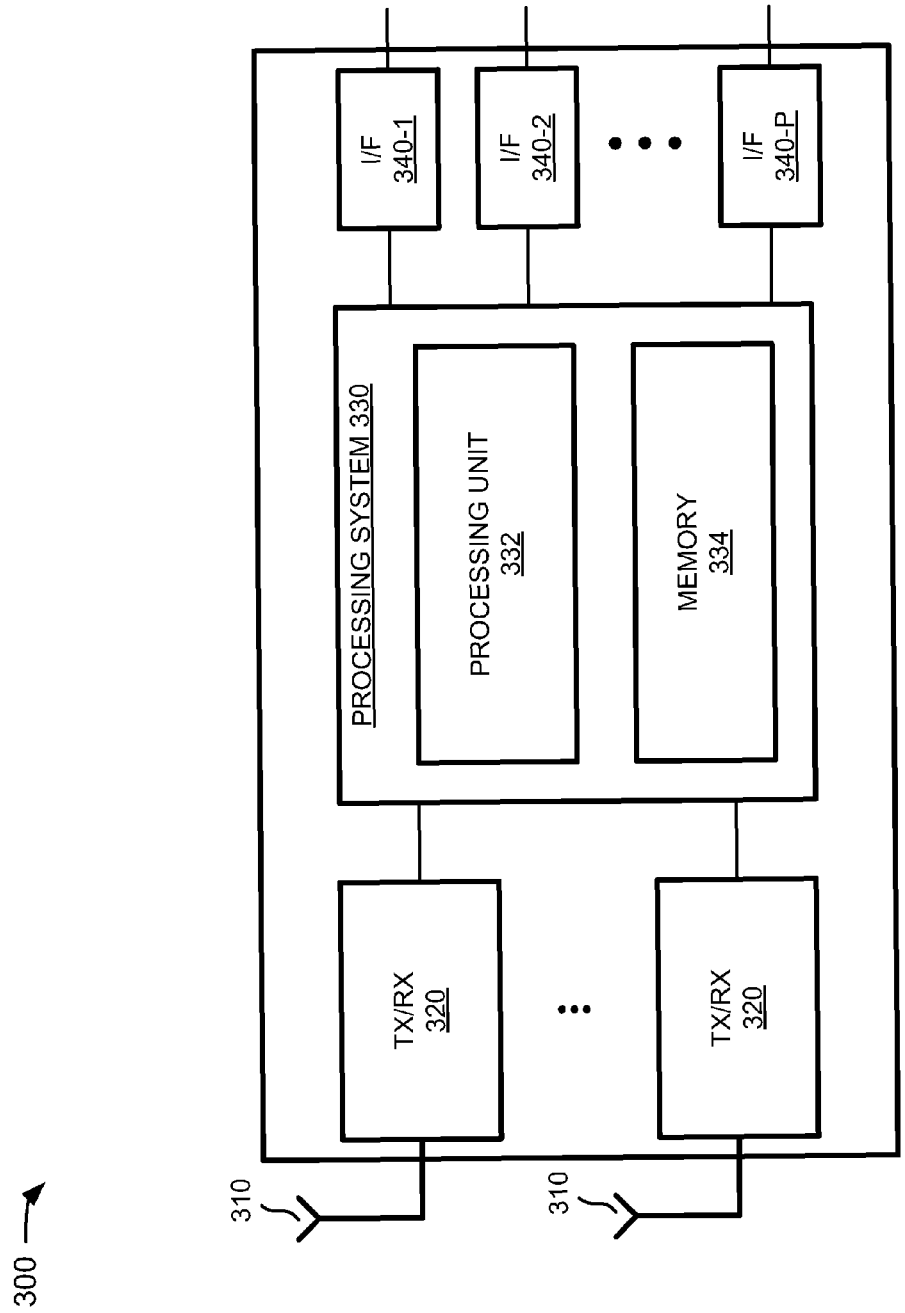
FIG. 3 is a diagram of example components of an eNB depicted in FIG. 1.

FIG. 3 is a diagram of example components of a device 300 that may correspond to eNB 120. Alternatively, or additionally, eNB 120 may include one or more devices 300. As shown in FIG. 3, device 300 may include antennas 310, transceivers (TX/RX) 320, a processing system 330, and a group of interfaces (I/Fs) 340-1, 340-2, . . . , 340-P (where P>1) (hereinafter referred to collectively as "I/Fs 340" and individually as "I/F 340").

Antennas 310 may include one or more directional and/or omni-directional antennas. Transceivers 320 may be associated with antennas 310 and may include transceiver circuitry for transmitting and/or receiving signals of a network, such as network 130, via antennas 310.

Processing system 330 may control the operation of device 300. Processing system 330 may also process information received via transceivers 320 and I/Fs 340. Processing system 330 may further measure quality and strength of a connection, may determine distances to user devices 110, and may perform load balancing operations associated with environment 100. As illustrated, processing system 330 may include a processing unit 332 and a memory 334.

Processing unit 332 may include one or more processors, microprocessors, ASICs, FPGAs, or the like. Processing unit 332 may process information received via transceivers 320 and/or I/Fs 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or I/F 340. Processing unit 332 may also process control messages and/or data messages received from transceivers 320 and/or I/F 340.

Processing unit 332 may host a load balancing application that enables eNB 120 to perform a load balancing operation. For example, processing unit 332 may use the load balancing application to process a load capacity status notification received from one or more MME devices via I/F 340 (e.g., I/F 340 associated with an S1-MME interface). In another example, processing unit 332 may cause device 300 to send a query to an MME device in order to receive an updated load capacity status notification. The status notification may include information corresponding to a load capacity and/or loading condition associated with one or more MME devices provided in, for example, network 130. Processing unit 332 may use the information corresponding to the load capacity and/or loading condition, from each of the MME devices with which device 300 is interconnected, to identify via which MME device, traffic associated with user device 110 is to be processed.

Memory 334 may include a RAM, a ROM, and/or another type of memory to store data and instructions that may be used by processing unit 332. For example, processing unit 332 may store, in memory 334, the information corresponding to the load capacity and/or loading condition in a load capacity data structure to be stored. Memory 334 may store information associated with the data structure in response to a write request received from processing unit 332 and/or may retrieve all or a portion of the information associated with the data structure in response to a read request received from processing unit 332.

I/F 340 may include one or more line cards that allow device 300 to transmit data to and/or receive data from devices within environment 100. For example, I/F 340 may correspond to an S1-MME interface via which device 300 communicates with an MME device. In another example, I/F 340 may correspond to an S1-U interface via which device 300 communicates with an SGW device. Device 300 may include another I/F 340 that corresponds to one or more other interfaces via which device 300 communicates with other devices within environment 100.

As will be described in detail below, device 300 may perform certain operations in response to processing unit 332 executing software instructions (e.g., computer program(s)) contained in a computer-readable medium, such as memory 334, a secondary storage device (e.g., hard disk, CD-ROM, etc.), or other forms of RAM or ROM. The software instructions may be read into memory 334 from another computer-readable medium or from another device. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, and/or additional components than those depicted in FIG. 3. Additionally, or alternatively, one or more components of device 300 may perform one or more other tasks described as being performed by one or more other components of device 300.

Figure 4:
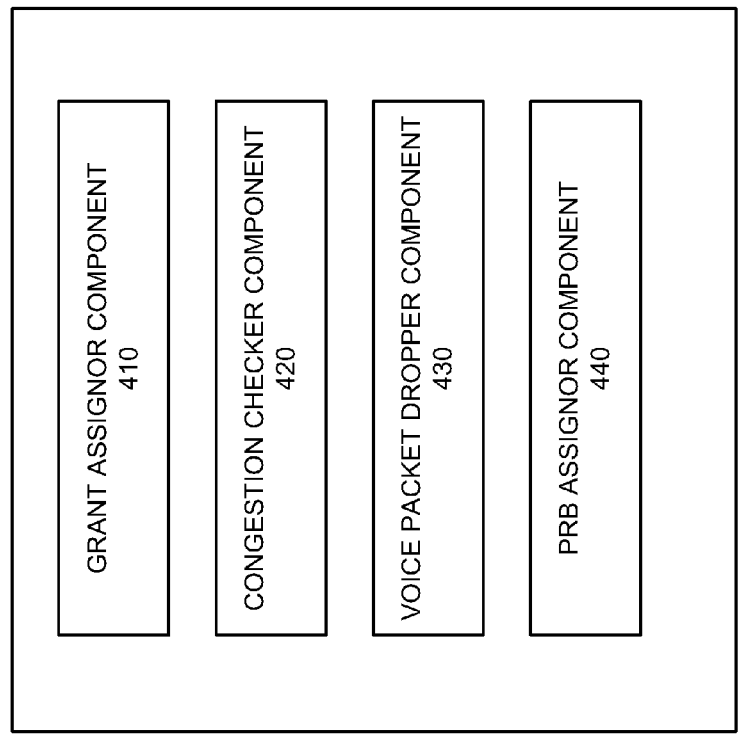
FIG. 4 is a diagram of example functional components of a scheduler depicted in FIG. 1.

FIG. 4 is a diagram of example functional components of scheduler 125. In one implementation, the functions described in connection with FIG. 4 may be performed by one or more components of device 300 (FIG. 3) or by one or more devices 300. As shown in FIG. 4, scheduler 125 may include a grant assignor component 410, a congestion checker component 420, a voice packet dropper component 430, and/or a PRB assignor component 440.

Grant assignor component 410 may receive scheduling requests from particular user devices 110. Each one of the scheduling requests may request that eNB 120 assign PRBs to transmit a packet from user device 110 via network 130. The scheduling requests may be for voice packets, such as voice over LTE (VoLTE) packets, and/or for other types of packets, such as data packets. Grant assignor component 410 may assign grants to the scheduling requests. A total quantity of the grants may depend on a quantity of user devices 110, a quantity of scheduling requests, a type of spectrum associated with the LTE network of environment 100, etc. A portion of the grants may be voice grants that are assigned to scheduling requests for voice packets. A quantity of the voice grants may be less than or equal to the total quantity of the grants.

Congestion checker component 420 may determine whether there is network congestion. For example, when the grants are assigned by grant assignor component 410, grant assignor component 410 may prompt congestion checker component 420 to determine whether there is network congestion. In one implementation, congestion checker component 420 may determine whether there is network congestion based on a quantity of PRBs that are used, by scheduler 125, during a particular period of time, as described further below with reference to FIG. 6. Congestion checker component 420 may notify/prompt voice packet dropper component 430 when congestion checker component 420 determines that there is network congestion. Otherwise, when congestion checker component 420 determines that there is no network congestion, congestion checker component 420 may not notify/prompt PRB assignor component 440.

Voice packet dropper component 430 may randomly drop voice packets to reduce the network congestion. For example, as described further below with reference to FIG. 5, voice packet dropper component 430 may randomly select particular ones of the grants. Voice packet dropper component 430 may remove particular scheduling requests associated with the particular grants, and may instruct grant assignor component 410 to re-assign the particular grants to other, more recently received, scheduling requests. When voice packet dropper component 430 removes the particular scheduling requests, voice packets associated with the particular scheduling requests may be dropped. Voice packet dropper component 430 may instruct PRB assignor component 440 to assign PRBs to other grants, of the grants, that were not randomly selected.

PRB assignor component 440 may assign PRBs to the other grants that were not randomly selected by voice packet dropper component 430. eNB 120 may use one or more assigned PRBs to transmit a packet, associated with one of the other grants, via network 130. After the one or more assigned PRBs are used, PRB assignor component 440 may re-assign the one or more assigned PRBs to another grant, which may be associated with another packet.

Although FIG. 4 shows example functional components of scheduler 125, in other implementations, scheduler 125 may include fewer functional components, different functional components, and/or additional functional components than those depicted in FIG. 4. Alternatively, or additionally, one or more functional components of scheduler 125 may perform one or more tasks described as being performed by one or more other functional components of scheduler 125.

Figure 5:
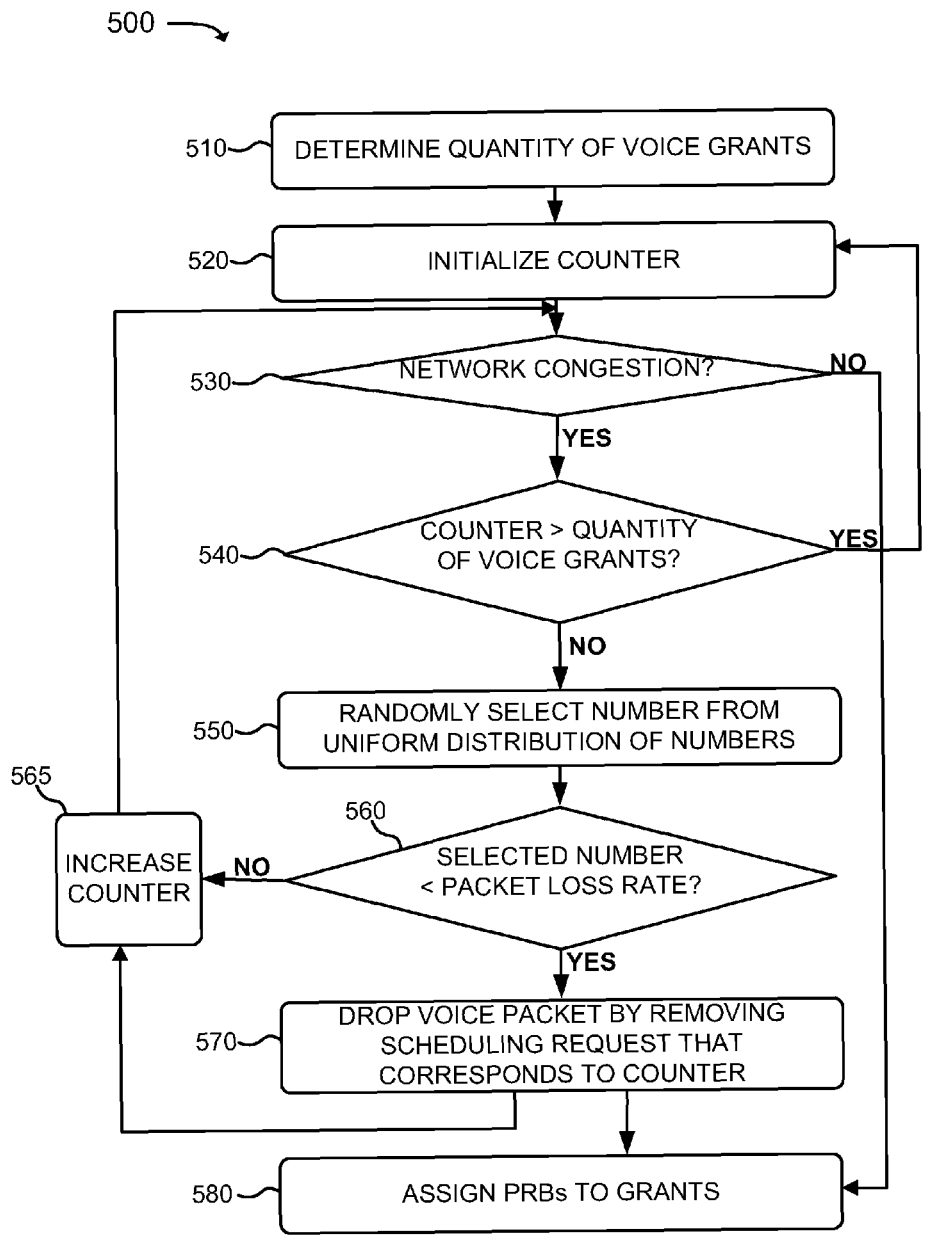
FIG. 5 is a flow chart of an example process for dropping voice packets.

FIG. 5 is a flow chart of an example process 500 for dropping voice packets. In one implementation, eNB 120 may perform process 500. Alternatively, or additionally, a device or collection of devices separate from, or in combination with, eNB 120 may perform some or all of process 500.

As shown in FIG. 5, process 500 may include determining a quantity of voice grants (block 510). For example, eNB 120 may receive, from user devices 110, scheduling requests for voice packets. eNB 120 may assign an individual grant to each one of the scheduling requests. Grants that are assigned to scheduling requests for voice packets may be referred to as voice grants. eNB 120 may determine a quantity of the voice grants.

Process 500 may further include initializing a counter (block 520). For example, eNB 120 may initialize a counter that is used for the voice grants. eNB 120 may initialize the counter by assigning, for example, a value of one to the counter.

Process 500 may also include determining whether there is network congestion (block 530). In one implementation, eNB 120 may receive a message from another network device, such as a MME (not shown in FIG. 1). The message may indicate whether there is network congestion associated with eNB 120 and/or network 130. eNB 120 may determine whether there is network congestion based on the message. In another implementation, eNB 120 may determine whether there is network congestion by using a process described below with reference to FIG. 6.

If there is network congestion (block 530—YES), process 500 may include determining whether the counter is greater than the quantity of the voice grants (block 540). For example, when eNB 120 determines that there is network congestion, eNB 120 may determine whether the counter is greater than the quantity of voice grants. In one example, when the quantity of the voice grants is equal to "100" and the counter is equal to "101," eNB 120 may determine that the counter (e.g., with a value of "101") is greater than the quantity of the voice grants.

If the counter is greater than the quantity of the voice grants (block 540—YES), process 500 may include re-initializing the counter (block 520). For example, when eNB 120 determines that the counter is greater than the quantity of the voice grants, eNB 120 may re-initialize the counter. eNB 120 may re-initialize the counter by re-assigning, for example, a value of one to the counter, which is assigned to the counter when the counter is initially initialized.

If the counter is not greater than the quantity of the voice grants (block 540—NO), process 500 may include randomly selecting a number from a uniform distribution of numbers (block 550) and determining whether the selected number is less than a packet loss rate (block 560). In one implementation, eNB 120 may store a uniform distribution of numbers. When eNB 120 determines that the counter is not greater than the quantity of the voice grants, eNB 120 may randomly select one of the numbers from the uniform distribution. For example, eNB 120 may select an integer that is greater than or equal to zero (0) and less than or equal to one-hundred (100) as the randomly selected number when the uniform distribution is a range of different integers between 0-100.

eNB 120 may further store, or have access to, a packet loss rate. The packet loss rate may correspond to a particular percentage of voice packets that may be dropped with no perceptual degradation of voice quality. For example, when the particular percentage is between one and three percent, the packet loss rate may have a value of between one and three. eNB 120 may determine whether the selected number is less than the packet loss rate.

If the selected number is less than the packet loss rate (block 560—YES), process 500 may include dropping a voice packet by removing a scheduling request that corresponds to the counter (block 570). In one implementation, when eNB 120 determines that the selected number (e.g., 1) is less than the packet loss rate (e.g., 2), eNB 120 may remove a scheduling request that was assigned a particular voice grant that corresponds to the counter. For example, when the counter is equal to 8, eNB 120 may remove a scheduling request that was assigned the eighth voice grant. When eNB 120 removes the scheduling request, a voice packet associated with the scheduling request may be dropped. eNB 120 may re-assign the particular voice grant to another scheduling request that was received after the removed scheduling request was originally received by eNB 120.

If the selected number is not less than the packet loss rate (block 560—NO) or after dropping the voice packet (block 570), process 500 may include increasing the counter (block 565) and again determining whether there is network congestion (block 530). In one implementation, when eNB 120 determines that the selected number (e.g., 15) is not less than the packet loss rate (e.g., 2) or after dropping the voice packet by removing the scheduling request, eNB 120 may increase the counter by the value of one. For example, when the counter is equal to fourteen, eNB may increase the counter to fifteen. After increasing the counter, eNB 120 may again determine whether there is network congestion.

If there is no network congestion (block 530—NO) or after dropping the voice packet (block 570), process 500 may include assigning PRBs to grants (block 580). For example, when eNB 120 determines that there is no network congestion or when eNB 120 drops the particular voice packet to reduce network congestion, eNB 120 may assign available PRBs to the grants, including the voice grants. eNB 120 may use the assigned PRBs to transmit packets, including the voice packets, via network 130. The packets may be associated with the scheduling requests to which the grants are assigned.

Figure 6:
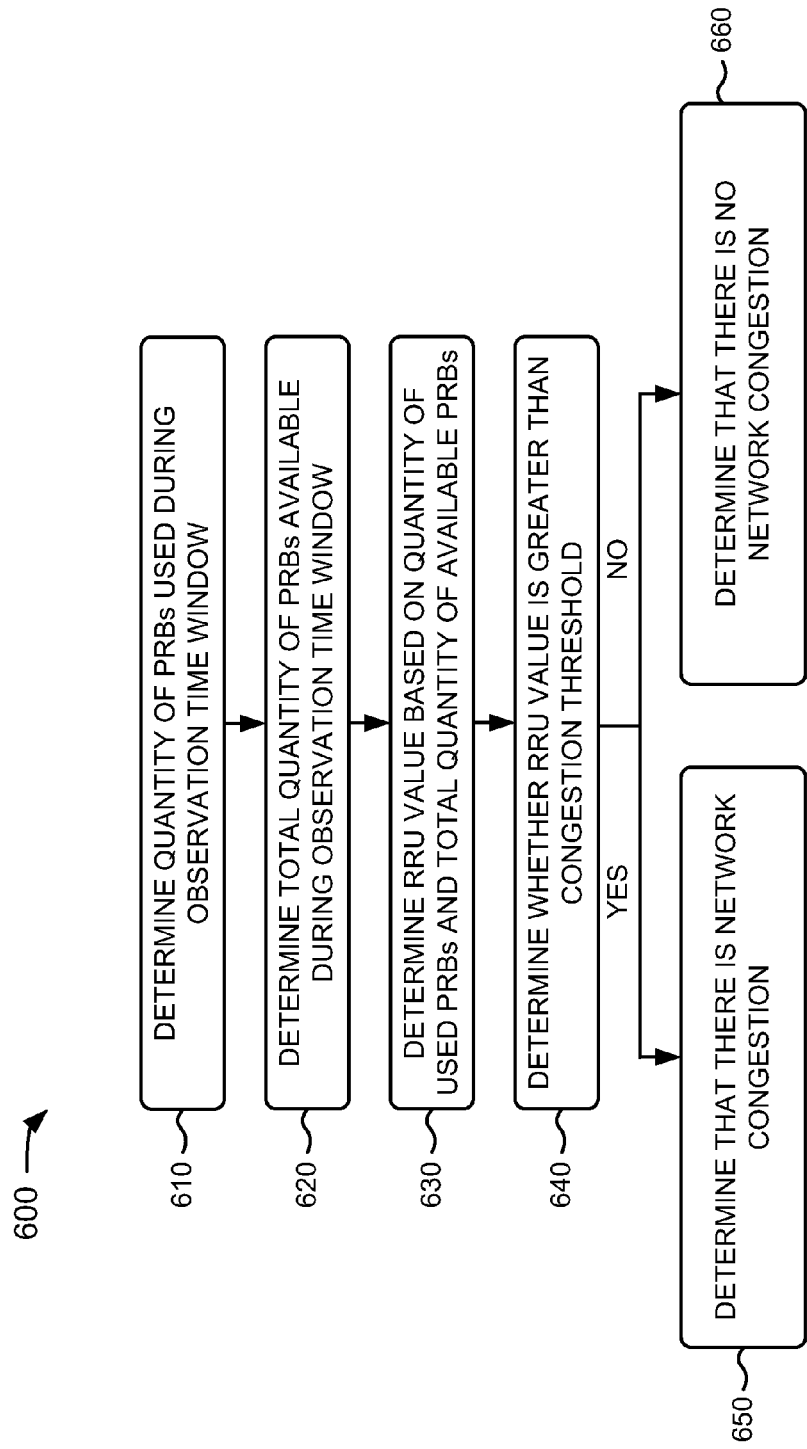
FIG. 6 is a flow chart of an example process for determining whether there is network congestion.

FIG. 6 is a flow chart of an example process 600 for determining whether there is network congestion. In one example, process 600 may correspond to process block 530 of FIG. 5. In one implementation, eNB 120 may perform process 600. Alternatively, or additionally, a device or collection of devices separate from, or in combination with, eNB 120 may perform some or all of process 600.

As shown in FIG. 6, process 600 may include determining a quantity of PRBs used during an observation time window (block 610) and determining a total quantity of PRBs available during the observation time window (block 620). In one implementation, eNB 120 may store a value for an observation time window, which is configured by an operator of eNB 120. The observation time window may specify a particular period of time, such as ten minutes, one hour, etc. eNB 120 may determine a quantity of PRBs that were used, by eNB 120, during the observation time window prior to the determination of the first quantity. As described above, PRBs may be assigned to grants, and may be used to transmit packets associated with the grants. eNB 120 may further determine a total quantity of PRBs that are available, to eNB 120, during the observation time window.

Process 600 may also include determining a radio resource utilization (RRU) value based on the quantity of used PRBs and the total quantity of available PRBs (block 630) and determining whether the RRU value is greater than a congestion threshold (block 640). In one implementation, eNB 120 may determine a RRU value, for the observation time window, based on the quantity of used PRBs and the total quantity of available PRBs by, for example, dividing the quantity of used PRBs (e.g., 70) by the total quantity of available PRBs (e.g., 100). In one example, the RRU value may indicate that a particular percentage of PRBs, such as 70% (e.g., 70/100), are used during the observation time window. eNB 120 may store or have access to a congestion threshold value. The congestion threshold value may indicate a particular percentage (e.g., 60%) at which the network is considered congested. eNB 120 may determine whether the RRU value is greater than the congestion threshold.

If the RRU value is greater than the congestion threshold (block 640—YES), process 600 may include determining that there is network congestion (block 650). For example, when eNB 120 determines that the RRU value (e.g., 70%) is greater than the congestion threshold (e.g., 60%), eNB 120 may determine that there is network congestion.

If the RRU value is not greater than the congestion threshold (block 640—NO), process 600 may include determining that there is no network congestion (block 660). For example, when eNB 120 determines that the RRU value (e.g., 65%) is not greater than the congestion threshold (e.g., 80%), eNB 120 may determine that there is no network congestion.

Systems and/or methods described herein may allow eNBs 120 to randomly drop voice packets when there is network congestion and without reducing a voice quality associated with the voice packets. As a result, eNBs 120 may reduce the network congestion and improve an experience of users of user devices 110 that are receiving data packets via eNBs 120 during the network congestion.

The foregoing description of implementations provides illustration and description, but is not intended to be exhaustive or to limit the implementations to the precise form disclosed. Modifications and variations are possible in light of the above disclosure or may be acquired from practice of the implementations.

Furthermore, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  initializing, by a device, a counter indicating a counter value;
  determining, by the device, a quantity of grants that are assigned to scheduling requests for voice over long term evolution (VoLTE) packets,
    the counter value corresponding to a VoLTE packet, of the VoLTE packets, that has been assigned a grant;
  determining, by the device, that there is network congestion in a network associated with the device;
  determining, by the device, that the counter value is less than the quantity of the grants assigned to the scheduling requests for the VoLTE packets;
  dropping, by the device, the VoLTE packet that corresponds to the counter value based on determining that there is network congestion and based on determining that the counter value is less than the quantity of the grants, dropping the VoLTE packet including:
    selecting a random number after determining that there is network congestion and after determining that the counter value is less than the quantity of the grants assigned to the scheduling requests for the VoLTE packets,
    determining that the random number is less than a packet loss rate, and
    dropping the VoLTE packet corresponding to the counter value based on determining that the random number is less than the packet loss rate;
  reassigning, by the device, the grant for the VoLTE packet that is dropped to a data packet based on dropping the VoLTE packet,
    the data packet having a lower transmission priority than the VoLTE packet that is dropped; and
  assigning, by the device, physical resource blocks (PRBs) to one or more of the grants that are associated with one or more of the VoLTE packets that are not dropped and to the grant associated with the data packet.

2. The method of claim 1,
  where determining that there is network congestion comprises:
    determining a first quantity of PRBs that are used, by the device, during a particular time period,
    determining a second quantity of PRBs that are available, to the device, during the particular time period,
    determining a value based on the first quantity and the second quantity,
    determining that the value satisfies a congestion threshold, and
    determining that there is network congestion based on determining that the value satisfies the congestion threshold.

3. The method of claim 1, further comprising:
  receiving scheduling requests from mobile devices, and
  assigning the grants to the scheduling requests.

4. The method of claim 1, where the packet loss rate is based on a percentage of VoLTE packets that may be dropped without perceptual degradation of voice quality.

5. The method of claim 1,
  where dropping the one of the VoLTE packets comprises:
    removing one of the scheduling requests that corresponds to the counter, and where the removed scheduling request is for the VoLTE packet.

6. The method of claim 1, further comprising:
  incrementing the counter value to a changed counter value based on dropping the VoLTE packet,
    the changed counter value corresponding to a different VoLTE packet, of the VoLTE packets, than the VoLTE packet;
  selecting a number from a uniform distribution of numbers;
  determining that the number is less than the packet loss rate; and
  dropping the different VoLTE packet corresponding to the changed counter value based on determining that the number is less than the packet loss rate,
    the different VoLTE packet corresponding to the changed counter value of the counter.

7. A device, comprising:
  a memory; and
  a processor, coupled to the memory to:
    initialize a counter indicating a counter value;
    receive, from mobile devices, scheduling requests for voice over long term evolution (VoLTE) packets and a data packet,
      the data packet having a lower transmission priority than the VoLTE packets, assign grants to the scheduling requests for the VoLTE packets, determine a quantity of grants that are assigned to the scheduling requests,
determine that there is network congestion in a network associated with the device,
determine that the counter value is less than the quantity of the grants that are assigned to the scheduling requests,
select a grant, from the grants assigned to the VoLTE packets, based on determining that there is network congestion and based on determining that the counter value is less than the quantity of the grants,
drop a VoLTE packet, of the VoLTE packets, that is assigned the grant, the processor, when dropping the VoLTE packet, is to:
  select a random number after determining that there is network congestion and after determining that the counter value is less than the quantity of the grants assigned to the scheduling requests for the VoLTE packets,
  determine that the random number is less than a packet loss rate, and
  drop the VoLTE packet based on determining that the random number is less than the packet loss rate,
reassign the grant for the VoLTE packet that is dropped to the data packet having the lower transmission priority, and
assign physical resource blocks (PRBs) to one or more of the grants that are associated with one or more of the VoLTE packets that are not dropped and the data packet.

8. The device of claim 7, where the processor is further to:
use the PRBs to transmit the one or more of the VoLTE packets that are not dropped and the data packet via the network,
receive new scheduling requests for new VoLTE packets, and
reassign the grants to the new VoLTE packets.

9. The device of claim 7, where the packet loss rate is based on a percentage of VoLTE packets that may be dropped without perceptual degradation of voice quality.

10. The device of claim 7, where, when dropping the VoLTE packet associated with the selected grant, the processor is to:
remove one of the scheduling requests that was assigned the grant.

11. The device of claim 7, where, when determining that there is network congestion, the processor is to:
determine a first quantity of PRBs that are used, by the device, during a particular time period,
determine a second quantity of PRBs that are available, to the device, during the particular time period,
determine a value based on the first quantity and the second quantity,
determine that the value satisfies a congestion threshold, and
determine that there is network congestion based on determining that the value satisfies the congestion threshold.

12. A non-transitory computer-readable medium storing instructions, the instructions comprising:
one or more instructions that, when executed by one or more processors of a device, cause the one or more processors to:
  initialize a counter indicating a counter value;
  receive, from mobile devices, scheduling requests for voice over long term evolution (VoLTE) packets and a data packet, the data packet having a lower transmission priority than the VoLTE packets; assign grants to the scheduling requests for the VoLTE packets;
  determine a quantity of grants that are assigned to the scheduling requests;
  determine that there is network congestion in a network associated with the device;
  determine that the counter value is less than the quantity of the grants that are assigned to the scheduling requests;
  select a grant, from the grants, based on determining that there is network congestion and based on determining that the counter value is less than the quantity of grants;
  drop a VoLTE packet, of the VoLTE packets, to which the grant is assigned, the one or more instructions, when executed by the one or more processors to drop the VoLTE packet, cause the one or more processors to:
    select a random number after determining that there is network congestion and after determining that the counter value is less than the quantity of the grants assigned to the scheduling requests for the VoLTE packets,
    determine that the random number is less than a packet loss rate, and
    drop the VoLTE packet based on determining that the random number is less than the packet loss rate;
  reassign the grant for the VoLTE packet that is dropped to the data packet having the lower transmission priority; and
  assign physical resource blocks (PRBs) to one or more of the grants that are associated with one or more of the VoLTE packets that are not dropped and the data packet.

13. The non-transitory computer-readable medium of claim 12, where the instructions further comprise:
one or more instructions that, when executed by the one or more processors of the device, cause the one or more processors to:
  use the PRBs to transmit the one or more of the VoLTE packets that are not dropped and the data packet via the network;
  receive new scheduling requests for new VoLTE packets; and
  reassign the grants to the new VoLTE packets.

14. The non-transitory computer-readable medium of claim 12, where the packet loss rate is based on a percentage of VoLTE packets that may be dropped without perceptual degradation of voice quality.

15. The non-transitory computer-readable medium of claim 12, where the one or more instructions to determine that there is network congestion comprise:
one or more instructions that, when executed by the one or more processors of the device, cause the one or more processors to:
  determine a first quantity of PRBs that are used, by the device, during a particular time period,
  determine a second quantity of PRBs that are available, to the device, during the particular time period,
  determine a value based on the first quantity and the second quantity,
  determine that the value satisfies a congestion threshold, and
  determine that there is network congestion based on determining that the value satisfies the congestion threshold.

16. The method of claim 1, further comprising:
   re-initializing the counter based on the counter value being greater than the quantity of the grants assigned to the scheduling requests for the VoLTE packets.

17. The device of claim 7, where the processor is further to:
   re-initialize the counter based on the counter value being greater than the quantity of the grants assigned to the scheduling requests for the VoLTE packets.

18. The non-transitory computer-readable medium of claim 12, where the instructions further comprise:
   one or more instructions that, when executed by the one or more processors of the device, cause the one or more processors to:
      re-initialize the counter based on the counter value being greater than the quantity of the grants assigned to the scheduling requests for the VoLTE packets.

19. The method of claim 1, where the data packet having the lower transmission priority than the VoLTE packet is associated with a web application.

20. The device of claim 7, where the data packet having the lower transmission priority than the VoLTE packet is associated with a web application.

\* \* \* \* \*